(12) United States Patent
Ward

(10) Patent No.: US 8,755,424 B2
(45) Date of Patent: Jun. 17, 2014

(54) TRANSMIT POWER CONTROL

(75) Inventor: Andrew Martin Robert Ward, Great Shelford (GB)

(73) Assignee: Ubisense Limited, Chesterton (GB)

( * ) Notice: Subject to any disclaimer, the term of this patent is extended or adjusted under 35 U.S.C. 154(b) by 151 days.

(21) Appl. No.: 13/383,177

(22) PCT Filed: Jul. 2, 2010

(86) PCT No.: PCT/EP2010/059503
§ 371 (c)(1),
(2), (4) Date: Mar. 8, 2012

(87) PCT Pub. No.: WO2011/003839
PCT Pub. Date: Jan. 13, 2011

(65) Prior Publication Data
US 2012/0163418 A1 Jun. 28, 2012

(30) Foreign Application Priority Data

Jul. 10, 2009 (GB) .................................. 0912082.5
Aug. 21, 2009 (GB) .................................. 0914700.0
Aug. 26, 2009 (GB) .................................. 0914919.6

(51) Int. Cl.
*H04B 1/00* (2006.01)
(52) U.S. Cl.
USPC ........... 375/130; 375/135; 375/136; 375/146; 375/147; 375/219; 375/295; 375/316
(58) Field of Classification Search
CPC H04B 10/40; H04L 25/0384; H04L 27/3405; H04L 27/3411; H04L 1/0029; H04L 9/004
USPC .......... 375/130, 141, 219, 135, 136, 146, 147, 375/295, 316
See application file for complete search history.

(56) References Cited

U.S. PATENT DOCUMENTS

| | | | |
|---|---|---|---|
| 5,510,800 A | 4/1996 | McEwan | |
| 2002/0153996 A1 | 10/2002 | Chan et al. | |
| 2003/0228875 A1 | 12/2003 | Alapuranen | |
| 2005/0238357 A1* | 10/2005 | Farrell | 398/119 |
| 2006/0203795 A1 | 9/2006 | Welborn et al. | |
| 2007/0291684 A1* | 12/2007 | Lee et al. | 370/328 |
| 2008/0311865 A1 | 12/2008 | Worfolk et al. | |

OTHER PUBLICATIONS

International Search Report and Written Opinion Issued in PCT/EP2010/059503, Sep. 24, 2010; 14 pages.

* cited by examiner

*Primary Examiner* — Dhaval Patel
(74) *Attorney, Agent, or Firm* — Rothwell, Figg, Ernst & Manbeck PC

(57) ABSTRACT

A radio transmitter for use with a coherent radio receiver comprising; transmission circuitry configured to transmit radio pulses in accordance with an underlying pulse transmission rate; receive circuitry configured to receive a message comprising an indication of a target transmit power of the radio transmitter; and power control circuitry configured to, in response to receiving said message, inhibit the transmission of selected radio pulses of the underlying pulse transmission rate so as to cause the transmission circuitry to transmit radio pulses at an effective pulse transmission rate having an average power in accordance with the target transmit power indication in the received message.

20 Claims, 3 Drawing Sheets

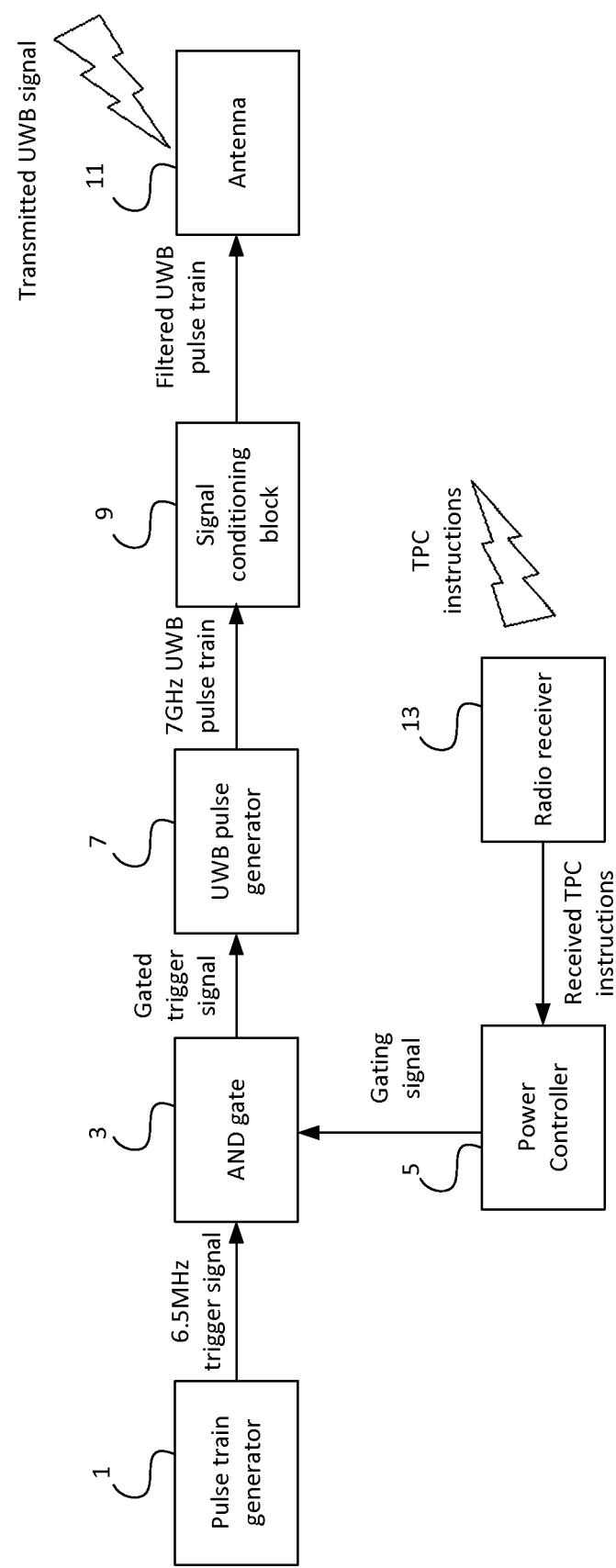
Figure 1 - Transmitter

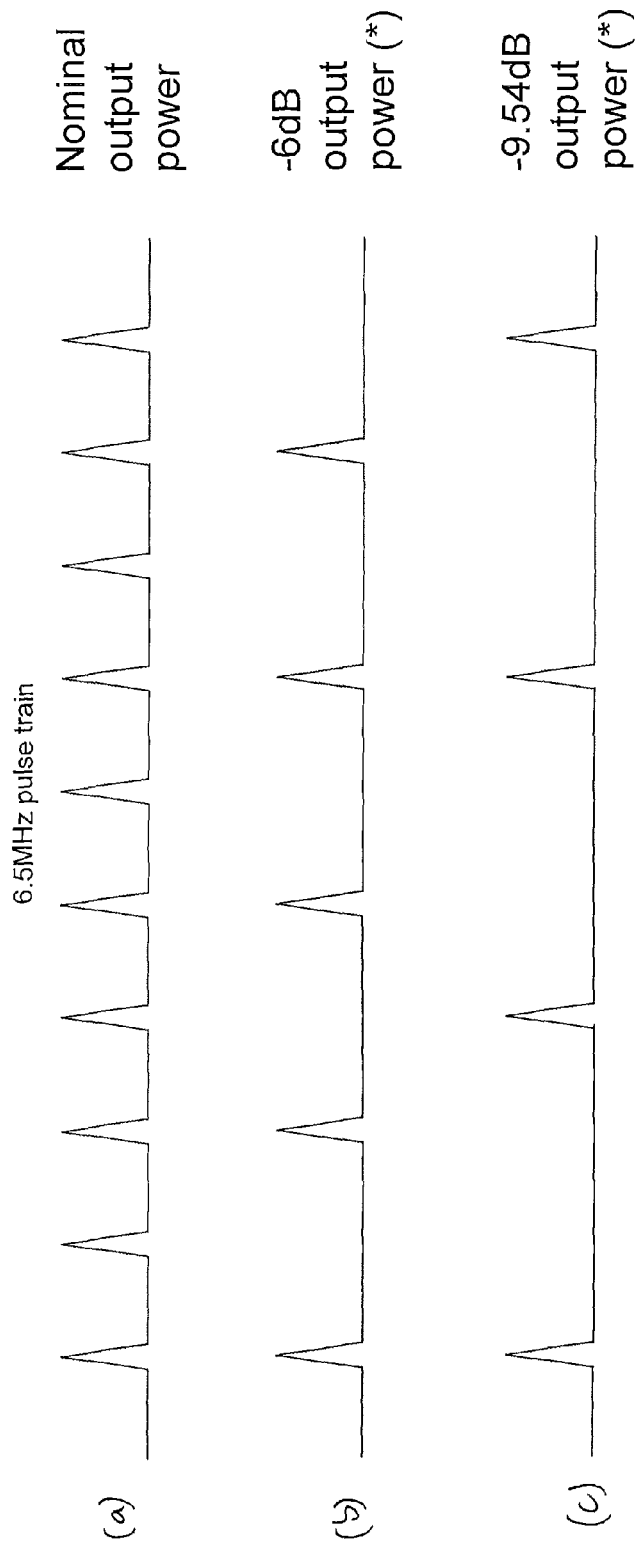
Figure 2 – Transmitted signal structure

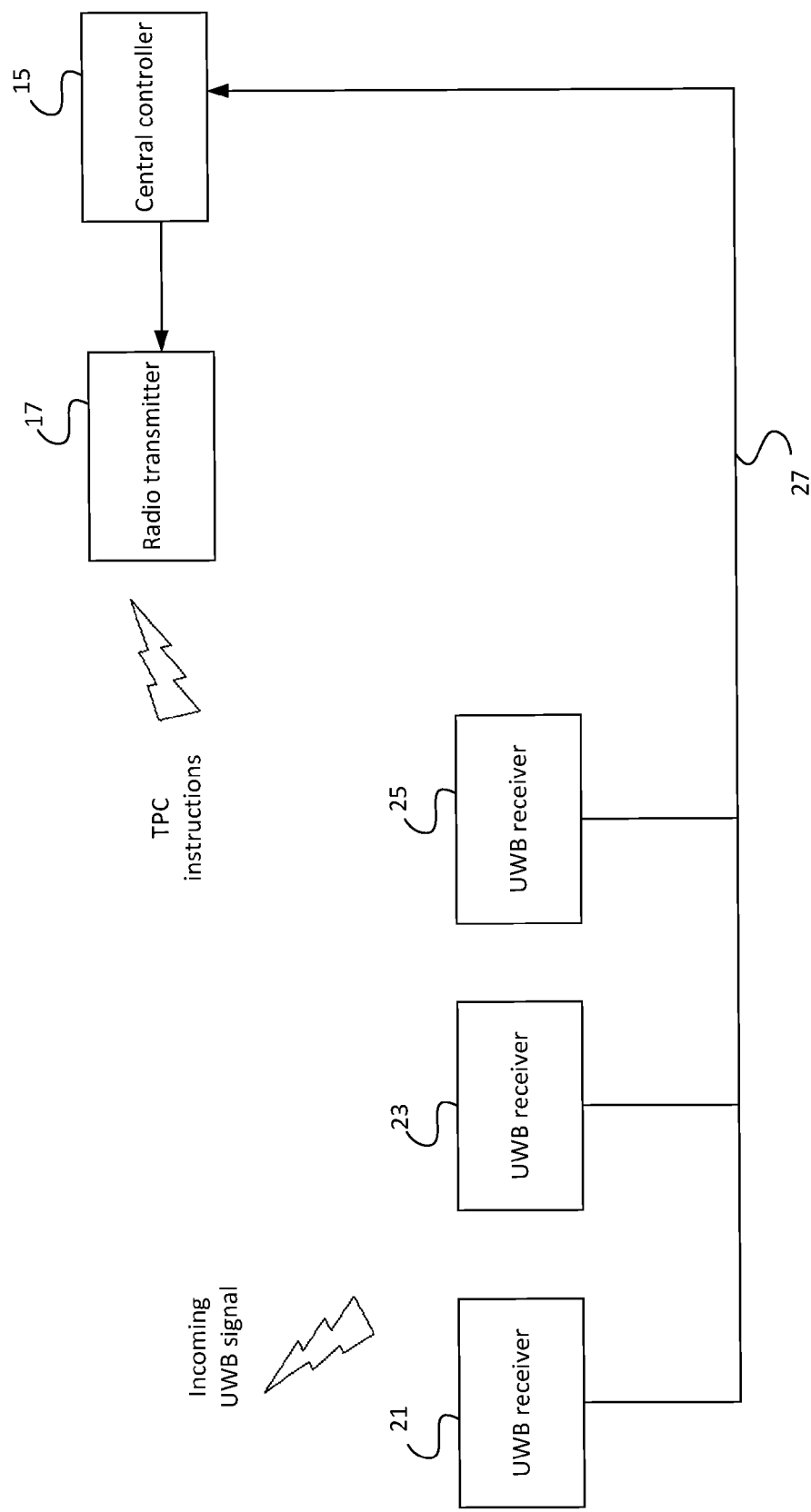
Figure 3 – Location system Overview

TRANSMIT POWER CONTROL

CROSS REFERENCE TO RELATED APPLICATION(S)

This application is a 35 U.S.C. §371 National Phase Entry Application from PCT/EP2010/059503, filed Jul. 2, 2010, designating the United States and also claims the benefit of Great Britain Application No. 0912082.5, filed Jul. 10, 2009, Great Britain Application No. 0914700.0, filed Aug. 21, 2009, and Great Britain Application No. 0914919.6, filed Aug. 26, 2009, the disclosures of which are incorporated herein in their entirety by reference.

BACKGROUND OF THE INVENTION

This invention relates to a method for controlling the transmission power of a pulsed signal and a transmitter for transmitting a pulsed signal of variable transmission power. In particular, the invention relates to a location system in which a transmitter transmits such a signal by means of which it can be located by receivers of the location system.

Ultrawideband (UWB) radio is a communications technology which uses short pulses of radiofrequency (RF) energy to transfer data and perform sensing functions. By using very short pulses, UWB signals have very high bandwidth compared to transmissions from traditional radio systems, and this confers advantages in both communicating data at very high speed and performing accurate sensing functions in cluttered environments.

One use of UWB radio technology is in location sensing applications. Typically, tags are attached to the objects to be located, and a network of sensors is placed at known points in the environment. UWB signals emitted by the tags are detected by the sensors, which use them to determine measurements such as the distance from the tag to the sensor. Processing logic can then combine the known sensor positions and the measurements to determine a 2D or 3D position for the tag. Typical UWB location systems are accurate to within a few tens of centimeters, even within environments that are normally challenging for radiolocation systems, for example those with many metal reflective surfaces.

Broadband pulses used in UWB systems typically occupy a bandwidth of hundreds to thousands of Megahertz in regions of the radio spectrum below 10.6 GHz. These regions have already been allocated by regulators to other services. The output powers of UWB transmitters are consequently normally limited by regulatory restrictions to extremely low levels, so as to limit potential interference from a UWB transmitter to other users.

In order to cope with the low power level of UWB signals, UWB receivers are often coherent radio receivers designed to detect a train of broadband radio pulses sent to it by a UWB transmitter. Coherent UWB receivers are able to integrate a number of UWB pulses prior to performing signal processing and detection. Such receivers can effectively "add up" the radio energy contained in multiple pulses to increase the sensitivity of the receiver and hence the range at which a signal may be detected and decoded. In the case of UWB location systems, this allows larger volumes to be mapped out with UWB tags and sensors without increasing the power of the UWB signals.

A coherent UWB receiver is typically configured to detect the presence or absence of an incoming train of UWB pulses, and measure properties of those pulses such as their time-of-arrival and phase. One suitable form of receiver is described in U.S. Pat. No. 5,510,800 which relates to a UWB receiver for position determination applications. The receiver uses a sampling gate to mix a replica of the expected incoming pulse with the incoming signal. The mixer yields a high output response when it is triggered with a pulse replica at the exact moment when a pulse arrives at the receiver, and a low response if it is triggered when no pulse arrives at the receiver. By adding an integrating circuit on the output of the mixer, and triggering the mixer with a train of replica pulses with the same pulse repetition frequency as the expected incoming signal, it is possible to integrate multiple pulses (those which arrive at the receiver over a period determined by the time constant of the integrator) and pass the integrated signal onto subsequent circuitry configured to perform signal detection and analysis.

Some regulatory regimes further specify that UWB transmitters must implement a Transmit Power Control (TPC) function, where they reduce transmit power if they are sufficiently close to sensors that they can afford to do so without compromising system performance. Such regulations do not specify how the UWB transmit power should be reduced but conventionally control of transmission power is implemented through the use of a variable gain amplifier or variable attenuator, which can be controlled to change the output power of the signal. However, these components are expensive and occupy space within the tag, which can be problematic, particularly in the case of transmitter tags for UWB location systems. It would therefore be greatly advantageous to achieve TPC compliance without increasing the size and cost of a tag.

There is thus a need for an improved UWB transmitter for use with coherent receivers which can perform Transmit Power Control without substantially increasing the cost, size and complexity of the transmitter.

SUMMARY OF THE INVENTION

According to a first aspect of the present invention there is provided a radio transmitter for use with a coherent radio receiver comprising: transmission circuitry configured to transmit radio pulses in accordance with an underlying pulse transmission rate; receive circuitry configured to receive a message comprising an indication of a target transmit power of the radio transmitter; and power control circuitry configured to, in response to receiving said message, inhibit the transmission of selected radio pulses of the underlying pulse transmission rate so as to cause the transmission circuitry to transmit radio pulses at an effective pulse transmission rate having an average power in accordance with the target transmit power indication in the received message.

The underlying pulse transmission rate defines pulse transmission times at which radio pulses can be transmitted in accordance with the underlying pulse transmission rate, and the transmission circuitry is configured to transmit radio pulses only at times coincident with these pulse transmission times.

The effective pulse transmission rate can be the average number of pulses transmitted per unit time by the radio transmitter. The average power of the effective pulse transmission rate can be the average number of radio pulses transmitted per unit time multiplied by the radio energy of each pulse. Preferably the underlying transmission rate is an integer multiple of the effective pulse transmission rate.

The indication of the target transmit power can be one of: an absolute or relative transmit power of the radio transmitter; an indication that the transmit power of the radio transmitter should be raised or lowered; and an indication of the strength of the radio pulses transmitted from the radio transmitter at one or more radio receiver(s).

Preferably the effective pulse transmission rate is selected from a predetermined set of pulse transmission rates. Preferably the predetermined set of pulse transmission rates is an ordered list of pulse transmission rates from a lowest predetermined pulse transmission rate to a highest predetermined pulse transmission rate. Preferably the highest predetermined pulse transmission rate is equal to the underlying pulse transmission rate. Preferably the power control circuitry is configured to, on receiving a message comprising an indication that the transmit power of the radio transmitter should be (a) raised or (b) lowered, select the (a) next higher or (b) next lower pulse transmission rate in the ordered list from the first pulse transmission rate.

The message can be a Transmit Power Control message.

Preferably the receive circuitry is a radio receiver.

Preferably the transmission circuitry comprises a radio pulse generator driven by a trigger pulse generator, the trigger pulse generator being arranged to generate trigger pulses at the underlying pulse transmission rate and the radio pulse generator being configured to transmit radio pulses at the rate at which it receives trigger pulses. Preferably the power control circuitry is configured to inhibit selected trigger pulses so as to provide trigger pulses at the effective pulse transmission rate to the radio pulse generator.

Preferably the power control circuitry comprises a power controller and an AND logic gate arranged between the trigger pulse generator and the radio pulse generator, the AND logic gate receiving at a first input a gate signal from the power controller and at a second input the trigger pulses from the trigger pulse generator, and the gate signal being modulated by the power controller so as to cause the AND logic gate to inhibit those trigger pulses corresponding to said selected radio pulses so as to cause the radio pulse generator to generate radio pulses at the effective pulse transmission rate. Preferably the power controller is a microcontroller.

The radio transmitter can be a UWB radio transmitter.

According to a second aspect of the present invention there is provided a UWB location system comprising a plurality of UWB radio transmitters as described herein and a plurality of coherent UWB radio receivers each configured to receive UWB radio pulses at the underlying pulse transmission rate. The UWB location system may further comprise a central controller coupled to the plurality of coherent UWB radio receivers and configured to form an indication of a target transmit power for a selected one of the UWB radio transmitters in dependence on the signal strength received at one or more of the coherent UWB radio receivers, the central controller being further configured to transmit a message comprising the indication of the target transmit power to the selected UWB radio transmitter.

According to a third aspect of the present invention there is provided a method for controlling the transmit power of a radio transmitter configured to transmit radio pulses in accordance with an underlying pulse transmission rate, the method comprising: receiving a message comprising an indication of a target transmit power of the radio transmitter; in accordance with the indication in the message, selecting radio pulses of the underlying pulse transmission rate which are not to be transmitted; and inhibiting the transmission of the selected radio pulses so as to cause the transmission circuitry to transmit radio pulses at an effective pulse transmission rate having an average power in accordance with the target transmit power indication in the received message.

DESCRIPTION OF THE DRAWINGS

The present invention will now be described by way of example with reference to the accompanying drawings, in which:

FIG. 1 is a schematic diagram of a UWB transmitter configured in accordance with the present invention.

FIG. 2 illustrates a pulsed transmit signal controlled in accordance with the present invention.

FIG. 3 is a schematic diagram of a UWB location system configured in accordance with the present invention.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention is directed to the control of transmit power in a pulsed radio transmitter and in particular to the control of transmit power in a coherent UWB radio system. The present application finds application in all transmitters which generate a series of pulses and which have to maintain a time-averaged power output below a predetermined level.

A radio transmitter configured in accordance with the present invention is shown in FIG. 1—in this case the radio transmitter is a UWB transmitter. The UWB transmitter comprises a pulse train generator 1, UWB pulse generator 7, signal conditioning block 9 and antenna 11. In the example transmitter depicted in FIG. 1, pulse train generator 1 provides a 6.5 MHz trigger signal to the UWB pulse generator 7, which is configured to produce a series of 7 GHz UWB pulses in response to receiving the pulse train. Signal conditioning block 9 performs signal conditioning on the UWB pulses, such as the removal of unwanted harmonics, so as to provide a clean signal for transmission via the antenna. Signal conditioning techniques for UWB signals are well known in the art and will not be described in further detail here. The present invention does not require the use of signal conditioning on the transmit path, although it is likely to be present in any practical implementation of a UWB transmitter in order to ensure that the transmission meet regulatory requirements.

It should be emphasized that FIG. 1 shows only one type of UWB transmitter, to which the present invention is in no way limited. Other types of UWB transmitter are known in the art to which the teachings of the present invention equally apply. Furthermore, the present invention is not limited to UWB transmitters and finds application in any radio transmitter configured to transmit a pulsed radio signal.

In a UWB transmitter of the type shown in FIG. 1, the pulse repetition rate provided to UWB pulse generator 7 can be controlled through the use of power controller 5, which is configured to provide a gate signal to AND gate 3. The output of AND gate 3 is HIGH when the output of pulse train generator 1 is HIGH, i.e. when a pulse is received from both the pulse train generator and the power controller, a pulse is sent to the UWB pulse generator 7. When the gate signal is LOW, trigger pulses generated at the pulse train generator are inhibited from being passed onto the UWB pulse generator and therefore no UWB radio pulse is transmitted by the radio transmitter.

To give some examples for a pulse train generator frequency of 6.5 MHz:
    i. if the gate signal is continuously HIGH, the trigger signal passed to the UWB pulse generator is simply the output from the pulse train generator, i.e. 6.5 MHz;
    ii. if the gate signal is a 3.25 MHz square wave then a 3.25 MHz trigger signal will be sent to the UWB pulse generator;
    iii. if the gate signal is high for one period of the 6.5 MHz pulse train and low for two periods of the pulse train, then a 2.17 MHz (one third of 6.5 MHz) trigger signal will be sent to the UWB pulse generator.

Because the spacing of pulses in the trigger signal controls the spacing of pulses in the UWB pulse train, the net effect of the arrangement shown in FIG. 1 is to control the spacing of UWB pulses transmitted by the transmitter and therefore the average power output of the transmitter. This is illustrated in FIG. 2, which shows the average output power of a 6.5 MHz pulse train being reduced as the inter-pulse gap is increased. The plots of pulse trains (a) to (c) correspond to the gate conditions set out at (i) to (iii) above, respectively.

Thus, by inhibiting selected trigger pulses the AND gate causes the UWB pulse generator to transmit at a reduced pulse transmission rate compared to the underlying pulse transmission rate at which the trigger pulse generator operates. This actual transmission rate of the radio transmitter is referred to as the effective pulse transmission rate, which is the average number of pulses transmitted per unit time by the radio transmitter (e.g. number of pulses transmitted per second). Since each pulse carries a given radio energy, the average radio power transmitted by the radio transmitter at the effective pulse transmission rate is therefore reduced compared to the radio power transmitted which would be transmitted if none of the trigger pulses were inhibited and the radio transmitter were to transmit at the underlying pulse transmission rate.

Power controller 5 can be configured to select trigger pulses for inhibition in accordance with any suitable algorithm so as to bring the average transmitted power level into line with the desired transmit power. However, it is preferably that the power controller selects pulses for inhibition as evenly as possible from a trigger pulse train so as to avoid fluctuations in the average transmitted power level. The average transmitted power is a measure of the total energy of the radio signals emitted per unit time (e.g. total emitted radio energy per second).

In UWB systems in which Transmit Power Control (TPC) is implemented (due to regulatory requirements or otherwise), there is a mechanism by which UWB receivers can send to one or more UWB transmitters a TPC notification indicative of a target transmit power. The target transmit power may be an absolute or relative target transmit power value, an indication that the transmit power should be raised or lowered, or an indication of the strength of the transmitted signal at the receiver(s). Typically UWB transmitters for use in a TPC system will include a radio receiver (or other wireless receiver) with which TPC notifications can be received. The radio receiver is preferably not a UWB receiver so as to avoid interference with the operation of the UWB system. Alternatively, the UWB transmitter may receive TPC notifications over a wired connection.

A radio receiver 13 for receiving TPC notifications is shown in FIG. 1. The radio receiver is configured to provide received TPC notifications to power controller 5 (note that there may be intermediate radio controller and protocol processing entities). The power controller is configured to control the gate signal it provides to AND gate 3 in accordance with the target transmit power indicated in the TPC notification. Thus, if the TPC notification indicates that the UWB transmit power should be lowered, the power controller controls the gate signal so as to inhibit selected trigger pulses and cause a trigger signal having an increased inter-pulse spacing to be provided to UWB pulse generator 7. Power controller 5 is preferably a microprocessor configured to process indications of target transit power and control the gate signal accordingly.

The present invention is not tied to the use of an AND gate controlled by a gate signal. The power controller may be any circuitry (integrated circuit, microprocessor etc.) configured to control the inter-pulse gap of radio pulses transmitted by a radio transmitter. For example, rather than inhibiting selected trigger pulses provided to a radio pulse transmitter of the type described above, a power controller configured in accordance with the present invention can directly inhibit radio pulse generator 7 from generating selected radio pulses (for example, by switching the radio pulse transmitter off whenever a radio pulse is to be suppressed). Alternatively, a power controller configured in accordance with the present invention can inhibit selected radio pulses from being transmitted following their generation at radio pulse generator 7.

In alternative embodiments of the present invention, power controller 5 may be configured to directly control the frequency of the trigger signal produced by pulse train generator 1. However, this is less preferred because coherent UWB receivers generally require extremely low jitter on the transmitted pulses to ensure that the receiver stands the best chance of being able to integrate the received pulses together. A coherent UWB receiver operating with a radio transmitter as described herein expects to receive pulses at the underlying pulse transmission rate; the better aligned the pulses are to the underlying pulse train (i.e. the less the jitter) the better the results of the coherent integration. Conventional methods for producing a variable frequency source from a fixed crystal clock, such as phase-locked-loops, all add extra jitter into the radio pulse train. Furthermore, conventional methods for providing a variable frequency source have substantial power requirements and are not therefore suitable for lower-power devices such as UWB tags for a location system. By inhibiting selected pulses in the radio pulse train, the present invention provides a low-power method by which transmit power can be controlled and which does not introduce additional jitter.

Typically, a TPC notification is transmitted to a UWB transmitter to indicate to the transmitter that it should adjust its power output. For example, if the UWB power received at a UWB receiver is above a predetermined threshold, a TPC notification can be sent to one or more UWB transmitters in the vicinity of that UWB receiver indicating that their transmit powers can be reduced. It is a requirement in some jurisdictions for a UWB system to implement TPC notifications in order to ensure that each transmitter operates at its lowest transmit power without compromising system performance. The use of TPC notifications in UWB location systems is set out in various documents, such as ETSI EN 302065 v1.1.1.

In the preferred implementations of the present invention in which the radio transmitter is part of a coherent UWB location system, a central controller manages the UWB transmitters (the tags) and receivers and transmits the TPC notifications to UWB transmitters of the system. FIG. 3 shows central controller 15 in the context of a UWB location system. Transmitter 19, which is configured in accordance with the present invention, sends the pulsed UWB signals to UWB receivers 21, 23, 25. The receivers detect the UWB signals, decode them and pass data to the central controller over network 27 to allow the central controller to determine the location of the tag.

Each receiver also reports the strength of the UWB signals it receives from the tag to central controller 15 via network 27. The central controller then determines, based on the reported signal strength of tag signals (and any failure to detect tag signals by the receivers) whether the tag transmit power should be increased, decreased, or should stay the same. On making this determination, it forms a notification indicating how the tag should adjust its transmit power and passes the (TPC) notification to radio transmitter 17, which broadcasts the notification to the tag 19. Tag 19 then controls its transmit power in accordance with the indication of the target transmit power provided in the notification (i.e. whether to increase or decrease the transmit power) in the manner described herein.

The strength of the UWB signals received at each receiver can be determined in any suitable manner, including: from the noise level of received signals; from a measurement of the power of the received signals; from a measurement of peak or average signal amplitude.

For the purpose of the present invention, it is important only that the radio transmitter receives an indication of a target transmit power. The mechanism of receipt of the notification and the format of the notification is not important. The indication can be in any form: an absolute or relative target transmit power value, an indication that the transmit power should be raised or lowered, or an indication of the strength of the transmitted signal at the receiver(s).

Thus, the present invention teaches that when the radio transmitter receives a notification that it should increase or decrease its transmitted power level, it adjusts the pulse repetition frequency of its transmissions upwards (to increase power), or downwards (to decrease power). For example, if the transmitter reduces the number of pulses it transmits per second by a factor of two, without changing the power in a single pulse, its mean total transmission power would fall by a factor of two, and the power in a single line of its output spectrum would fall by a factor of four (since there would be twice as many spectral lines, and the total power, which is halved itself, would be distributed amongst all of them). Current regulations that specify TPC mechanisms for UWB systems do not require the peak power of the signal to be varied, which is governed by the output level of an individual pulse, not the average.

An example of the preferred embodiment of the present invention follows. Consider a radio transmitter configured in accordance with the present invention comprising a power controller that is currently inhibiting every nth pulse (where n is an integer) of the underlying pulse train (which is a train of evenly spaced pulses at the underlying pulse transmission rate). In response to receiving a notification that the transmit power is to be decreased, the power controller selectively inhibits every (n−1)th pulse of the underlying pulse train. Conversely, in response to receiving a notification that the transmit power is to be increased, the power controller selectively inhibits every (n+1)th pulse of the underlying pulse train. It will be apparent to those of skill in the art that many variations on the above described algorithm are possible, such as inhibiting two pulses every mth pulse etc.

If the notification indicates by how much the transmission power is to be increased or decreased, the power controller is preferably configured to increase or decrease the effective pulse transmission rate of the radio transmitter so as to satisfy the target power indicated in the notification.

The present invention can be used in all kinds of radio transmitters configured to transmit radio frequency signals as a series of pulses, including UWB radio transmitters. The present invention is of particular use in the transmitter "tags" of UWB location systems which use coherent radio receivers. The use of coherent receivers imposes some restrictions on the pulse repetition frequency that can be selected by the UWB transmitter. A coherent receiver knows the underlying pulse transmission rate at which a transmitter operating in the system transmits UWB pulses. This allows the receiver to integrate over several pulses so as to improve its effective sensitivity. However, this means a coherent receiver is configured to receive pulses only in certain "windows" defined by the underlying pulse transmission rate. In order for the pulses of a radio transmitter to be received at a coherent receiver, each pulse must therefore be transmitted in one of these windows. The present invention teaches that by inhibiting selected radio pulses from being transmitted, the transmitted radio power can be controlled whilst maintaining the alignment between the radio pulses and the underlying pulse transmission rate (and hence minimizing the jitter, as discussed above).

The present invention thus provides an improved method for controlling the transmission power of pulsed radio transmitters that can be used with coherent receivers.

The power controller of a radio transmitter configured in accordance with the present invention can inhibit radio pulses according to any predetermined scheme so as to control the power output of the radio transmitter. In the cases in which the transmitted radio pulses are evenly-spaced this leads to a simple integer relationship between the underlying pulse transmission rate and the effective transmission rate of pulses actually emitted by the radio transmitter. For example, if the coherent receiver is expecting the signal to be of underlying frequency f, then the transmitter can reduce its power yet maintain an evenly-spaced train of output pulses by selecting an output frequency which is f divided by an integer. So the possible output frequencies which can be used by the tag are f/2, f/3, f/4, etc., giving reductions of power in the highest spectral line of 6.02 dB, 9.54 dB, 12 dB, and so on. In general, for an evenly-spaced output pulse train, if the underlying frequency is f, and the transmitter's effective output frequency is x, then the change in total mean output power is $10 \log_{10}(x/f)$, and the change in the power of the highest spectral line is $20 \log_{10}(x/f)$. In alternative embodiments of the present invention, the radio transmitter can be restricted to transmitting radio pulses at a frequency which is the underlying frequency divided by an integer.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A radio transmitter for use with a coherent radio receiver comprising:
    transmission circuitry configured to transmit radio pulses in accordance with an underlying pulse transmission rate;

receive circuitry configured to receive a message from an entity external to the radio transmitter comprising an indication of a target transmit power of the radio transmitter; and power control circuitry configured to, in response to receiving said message, inhibit the transmission of selected radio pulses of the underlying pulse transmission rate so as to cause the transmission circuitry to transmit radio pulses at an effective pulse transmission rate having an average power in accordance with the target transmit power indication in the received message.

2. The radio transmitter as claimed in claim 1, wherein the underlying pulse transmission rate defines pulse transmission times at which radio pulses can be transmitted in accordance with the underlying pulse transmission rate, and the transmission circuitry is configured to transmit radio pulses only at times coincident with these pulse transmission times.

3. The radio transmitter as claimed in claim 1, wherein the effective pulse transmission rate is the average number of radio pulses transmitted per unit time by the radio transmitter.

4. The radio transmitter as claimed in claim 1, wherein the average power of the effective pulse transmission rate is the average number of radio pulses transmitted per unit time multiplied by the radio energy of each pulse.

5. The radio transmitter as claimed in claim 1, wherein the underlying transmission rate is an integer multiple of the effective pulse transmission rate.

6. The radio transmitter as claimed in claim 1, wherein the indication of the target transmit power is one of:
an absolute or relative transmit power of the radio transmitter;
an indication that the transmit power of the radio transmitter should be raised or lowered; and
an indication of the strength of the radio pulses transmitted from the radio transmitter at one or more radio receiver(s).

7. The radio transmitter as claimed in claim 1, wherein the effective pulse transmission rate is selected from a predetermined set of pulse transmission rates.

8. The radio transmitter as claimed in claim 7, wherein the predetermined set of pulse transmission rates is an ordered list of pulse transmission rates from a lowest predetermined pulse transmission rate to a highest predetermined pulse transmission rate.

9. The radio transmitter as claimed in claim 7, wherein the highest predetermined pulse transmission rate is equal to the underlying pulse transmission rate.

10. The radio transmitter as claimed in claim 8, wherein the power control circuitry is configured to, on receiving a message comprising an indication that the transmit power of the radio transmitter should be (a) raised or (b) lowered, select the (a) next higher or (b) next lower pulse transmission rate in the ordered list from the first pulse transmission rate.

11. The radio transmitter as claimed in claim 1, wherein the message is a Transmit Power Control message.

12. The radio transmitter as claimed in claim 1, wherein the receive circuitry is a radio receiver.

13. The radio transmitter as claimed in claim 1, wherein the transmission circuitry comprises a radio pulse generator driven by a trigger pulse generator, the trigger pulse generator being arranged to generate trigger pulses at the underlying pulse transmission rate and the radio pulse generator being configured to transmit radio pulses at the rate at which it receives trigger pulses.

14. The radio transmitter as claimed in claim 13, wherein the power control circuitry is configured to inhibit selected trigger pulses so as to provide trigger pulses at the effective pulse transmission rate to the radio pulse generator.

15. The radio transmitter as claimed in claim 13, wherein the power control circuitry comprises a power controller and an AND logic gate arranged between the trigger pulse generator and the radio pulse generator, the AND logic gate receiving at a first input a gate signal from the power controller and at a second input the trigger pulses from the trigger pulse generator, and the gate signal being modulated by the power controller so as to cause the AND logic gate to inhibit those trigger pulses corresponding to said selected radio pulses so as to cause the radio pulse generator to generate radio pulses at the effective pulse transmission rate.

16. The radio transmitter as claimed in claim 15, wherein the power controller is a microcontroller.

17. The radio transmitter as claimed in claim 1, wherein the radio transmitter is a UWB radio transmitter.

18. The UWB location system comprising a plurality of UWB radio transmitters as claimed in claim 17 and a plurality of coherent UWB radio receivers each configured to receive UWB radio pulses at the underlying pulse transmission rate.

19. The UWB location system as claimed in claim 18, further comprising a central controller coupled to the plurality of coherent UWB radio receivers and configured to form an indication of a target transmit power for a selected one of the UWB radio transmitters in dependence on the signal strength received at one or more of the coherent UWB radio receivers, the central controller being further configured to transmit a message comprising the indication of the target transmit power to the selected UWB radio transmitter.

20. A method for controlling the transmit power of a radio transmitter configured to transmit radio pulses in accordance with an underlying pulse transmission rate, the method comprising:
receiving a message from an entity external to the radio transmitter comprising an indication of a target transmit power of the radio transmitter;
in accordance with the indication in the message, selecting radio pulses of the underlying pulse transmission rate which are not to be transmitted; and
inhibiting the transmission of the selected radio pulses so as to cause the transmission circuitry to transmit radio pulses at an effective pulse transmission rate having an average power in accordance with the target transmit power indication in the received message.

* * * * *